(12) United States Patent
Lahtiranta et al.

(10) Patent No.: US 10,505,957 B2
(45) Date of Patent: Dec. 10, 2019

(54) USER VERIFICATION

(71) Applicant: Yahoo!, Inc., Sunnyvale, CA (US)

(72) Inventors: Atte Tapio Lahtiranta, Cupertino, CA (US); Matti Juhani Oikarinen, San Jose, CA (US)

(73) Assignee: Oath Inc., New York, NY (US)

( * ) Notice: Subject to any disclaimer, the term of this patent is extended or adjusted under 35 U.S.C. 154(b) by 322 days.

(21) Appl. No.: 14/982,081

(22) Filed: Dec. 29, 2015

(65) Prior Publication Data

US 2017/0187725 A1 Jun. 29, 2017

(51) Int. Cl.
*H04L 29/06* (2006.01)

(52) U.S. Cl.
CPC ........ *H04L 63/1425* (2013.01); *H04L 63/083* (2013.01)

(58) Field of Classification Search
CPC .......................... H04L 63/1425; H04L 63/083
USPC .............................................................. 726/9
See application file for complete search history.

(56) References Cited

U.S. PATENT DOCUMENTS

| | | | | |
|---|---|---|---|---|
| 7,721,329 | B2 * | 5/2010 | Toomey | G06F 21/31 726/9 |
| 7,860,883 | B2 * | 12/2010 | Hinton | G06F 17/30545 707/769 |
| 8,468,244 | B2 * | 6/2013 | Redlich | G06Q 10/06 705/50 |
| 8,843,997 | B1 * | 9/2014 | Hare | H04L 63/0281 709/200 |
| 9,251,464 | B1 * | 2/2016 | Kellas-Dicks | G06F 21/316 |
| 9,400,645 | B2 * | 7/2016 | Mahajan | G06F 8/43 |
| 9,672,336 | B1 * | 6/2017 | Spence | G06F 21/31 |
| 2004/0225894 | A1 * | 11/2004 | Colvin | G06F 21/121 726/27 |
| 2009/0132813 | A1 * | 5/2009 | Schibuk | G06Q 20/223 713/158 |
| 2010/0095357 | A1 * | 4/2010 | Willis | G06F 21/6245 726/6 |
| 2011/0185407 | A1 * | 7/2011 | Perrot | G06F 21/34 726/6 |
| 2013/0023240 | A1 * | 1/2013 | Weiner | H04W 12/06 455/411 |
| 2013/0036459 | A1 * | 2/2013 | Liberman | H04L 9/0866 726/6 |
| 2013/0060708 | A1 * | 3/2013 | Oskolkov | G06Q 20/10 705/75 |

(Continued)

*Primary Examiner* — Jahangir Kabir
(74) *Attorney, Agent, or Firm* — Cooper Legal Group, LLC

(57) ABSTRACT

One or more computing devices, systems, and/or methods for verifying a user of a service are provided. That is, the service (e.g., a social network, an email service, a website, etc.) may attempt to verify that a user is an owner of an account with the service by sending a verification code to a device registered by the user with the service, such as through a text message. Because the service may be hosted across multiple data centers for resiliency against failure, the verification code and a verification attempt counter may be stored within a particular data store. An identification of the data store may be encoded into the verification code. In this way, the verification code may be sent to the device, such that when the user submits the verification code back to the service, the verification code is routed to the correct data store for verification.

20 Claims, 11 Drawing Sheets

(56) References Cited

U.S. PATENT DOCUMENTS

| | | | | |
|---|---|---|---|---|
| 2014/0162598 A1* | 6/2014 | Villa-Real | ............... | H04M 1/66 455/411 |
| 2014/0172549 A1* | 6/2014 | Esmailzadeh | ........... | H04L 51/32 705/14.45 |
| 2014/0201331 A1* | 7/2014 | Kershaw | ............... | H04W 4/185 709/219 |
| 2014/0237231 A1* | 8/2014 | Spalka | ................ | G06F 21/6218 713/165 |
| 2014/0282964 A1* | 9/2014 | Stubblefield | ........ | H04L 63/0853 726/7 |
| 2015/0012339 A1* | 1/2015 | Onischuk | ............... | G07C 13/00 705/12 |
| 2015/0058931 A1* | 2/2015 | Miu | ...................... | H04L 63/126 726/3 |
| 2015/0127547 A1* | 5/2015 | Powell | ................ | G06Q 20/382 705/67 |
| 2017/0012951 A1* | 1/2017 | Mennes | ................ | H04L 9/3215 |

\* cited by examiner

USER VERIFICATION

BACKGROUND

Many services, such as a website, an email service, a social network, etc., may employ various security techniques to mitigate unauthorized access to user information. For example, a social network service may perform a verification to verify that a user attempting to access a social network account is indeed an owner of a registered email account (e.g., a verification code or link may be sent to an email address of the user), an owner of a registered device (e.g., the verification code or link may be sent to a mobile device of the user), etc. The user may submit the verification code back to the social network service for verification. A verification attempt counter may be maintained to track whether the user (e.g., a malicious attacker) has attempted to verify with the social network service over a threshold amount of attempts, and thus the social network account may be locked or some other security policy may be implemented.

In an example, the service may be hosted across a plurality of data centers for resiliency against failures. For example, the social network account may be stored within multiple data centers, such that if a data center fails, then a surviving data center has access to the social network account for providing the user with uninterrupted access to the social network service. Unfortunately, parallel attacks on multiple data centers may be performed by an attacker in an attempt to falsely verify that the attacker is the user, such as by using a bot to submit codes that may potentially match the verification code. Because the attempts are performed in parallel, the verification attempt counter may not be updated quick enough to adequate track an accurate number of attempts by the attacker, and thus the attacker may more easily falsely verify as the user because of having more verification attempts than the threshold amount of attempts. Significant processing and client access latency may be introduced if replication or other techniques are used to store the verification code and the verification attempt counter across multiple data centers in a consistent manner.

SUMMARY

In accordance with the present disclosure, one or more computing devices and/or methods for verifying a user of a service are provided. In an example, a determination may be made that a user of a service (e.g., a user attempting to gain access to the service or a feature of the service such as to change a password of a social network account) is to be verified (e.g., verified as a true owner of the social network account). An initial verification code may be generated (e.g., a 4 digit code). The initial verification code may be modified to identify a data store, of a plurality of data stores used by the service to store data (e.g., databases maintained within different data centers), to create a verification code to store within the data store for subsequent verification (e.g., an identification of the data store may be encoded into the initial verification code to create the verification code). For example, initial verification code may be modified based upon various encoding techniques, such as a modification of a digit, of the verification code, used to represent the data store; a numerical range of digits assigned to the data store may be encoded into the verification code; the use of a secret key (e.g., a key maintained by the service); the user of a user specific key (e.g., a key specific to the user such as a key based upon a username or other user specific information); the use of a hash collision technique using a secret salt and/or a user specific salt; and/or a temporal factor (e.g., the use of a day of the year as an input to a user specific verification code, and a verification attempt counter may limit how many user specific verification codes may be generated for a user per day). The verification code and the verification attempt counter may be stored within the data store.

The verification code may be sent to a device of the user (e.g., a text message, comprising the verification code, may be sent to a registered mobile device of the account owner). A submitted verification code may be received (e.g., the user may submit the verification code to the service). The submitted verification code may be evaluated to determine that the submitted verification code is to be routed to a particular data store (e.g., if the submitted verification code is the verification code, then the submitted verification code may be routed to the data store within which the verification code and the verification attempt counter is stored). Accordingly, the submitted verification code is routed to the data store for verification of the user by determining whether the submitted verification code matches the verification code and whether the verification attempt counter is below a threshold number of attempts.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
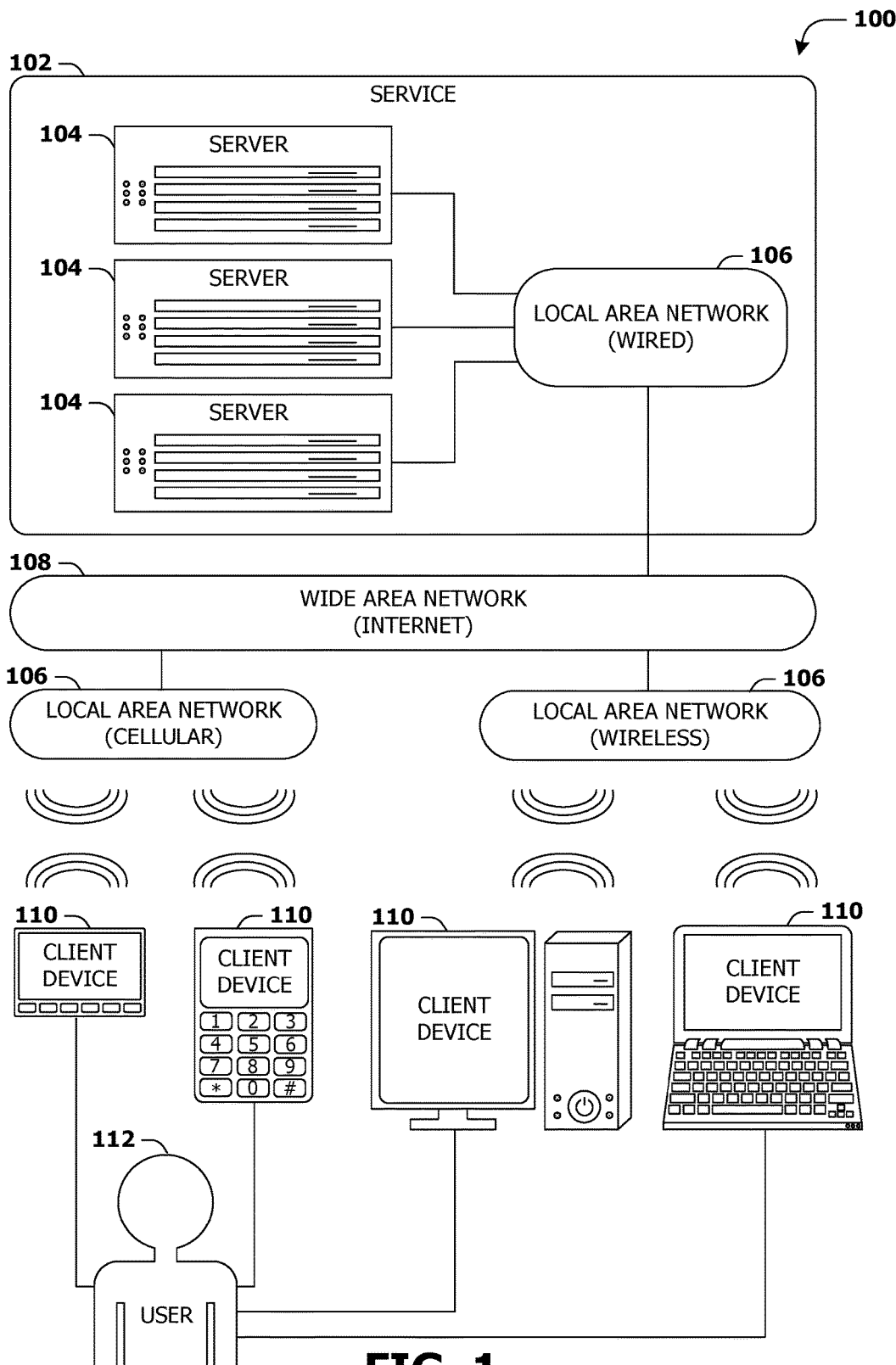
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
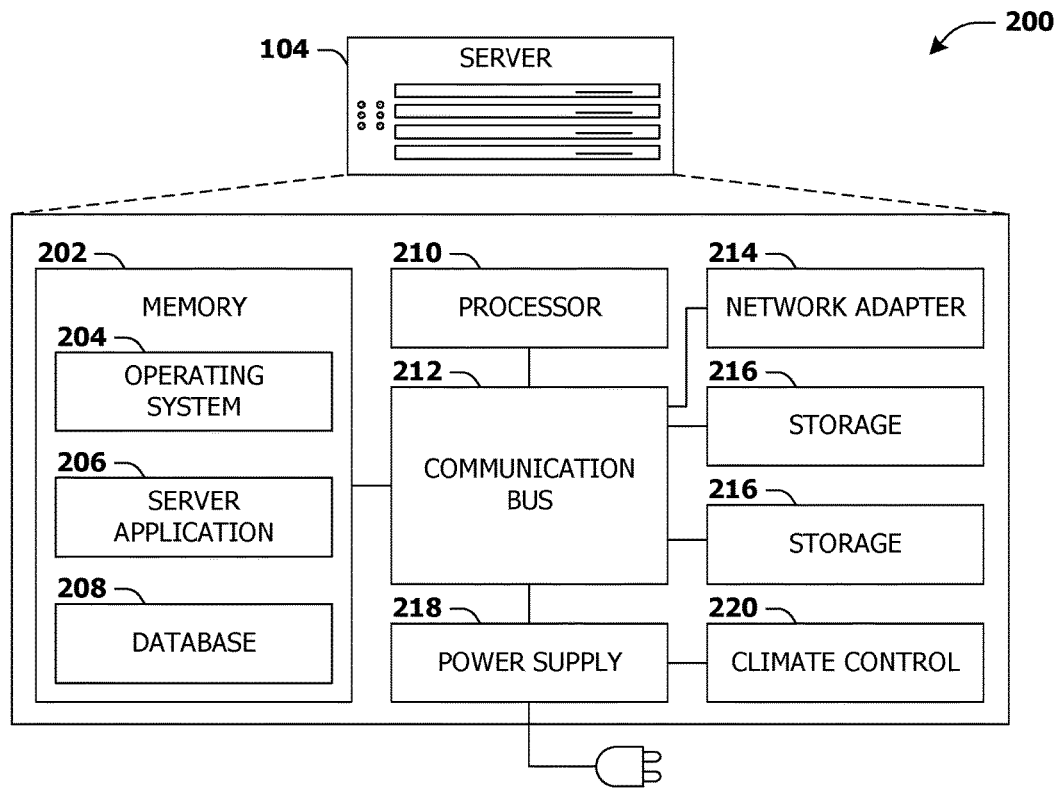
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
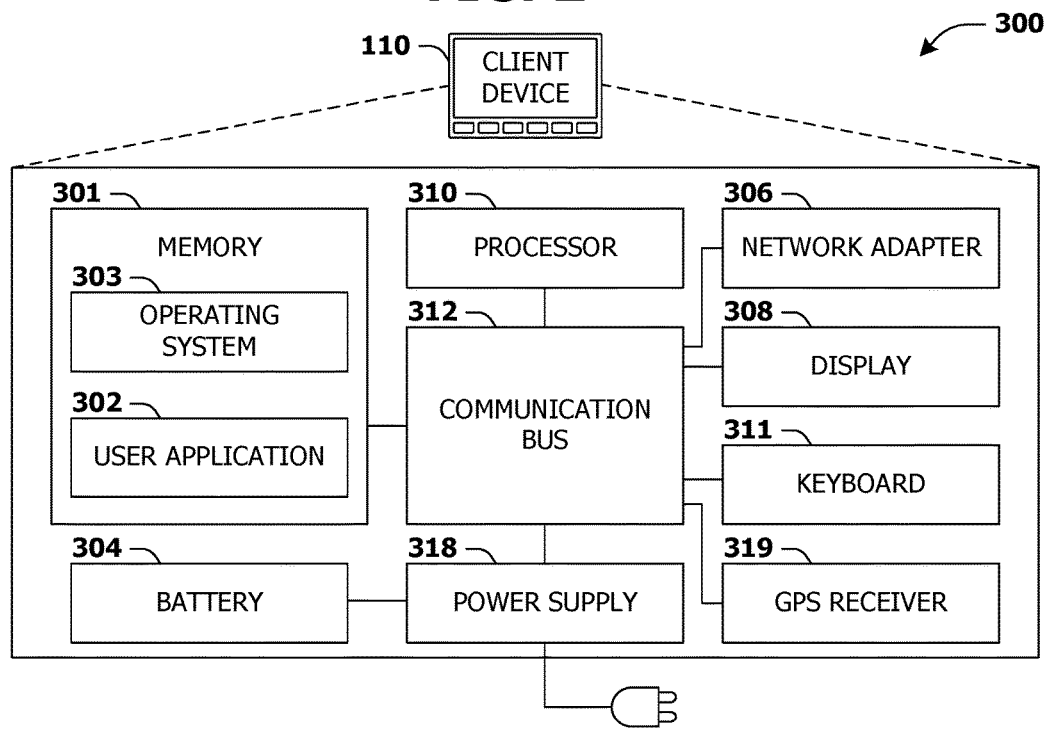
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for verifying a user of a service are provided. A service (e.g., an email service, a photo sharing service, a videogame service, an app store, a website, etc.) may utilize verification codes for verifying that a user, attempting to access the service (e.g., log into a user account with the service, reset a password, add a new phone number to the user account, etc.), is an owner of a user account with the service. A verification attempt counter may be maintained (e.g., incremented for each failed verification attempt) in order to stop the user from attempting to verify more than a threshold amount of attempts, which may mitigate an attack by a malicious user to falsely verify as the user in order to gain unauthorized access to the user account. If the user account is maintained across a plurality of data stores, such as within databases maintained by different data centers, then the malicious user may perform parallel attempts upon multiple data centers in order to perform more attempts than allowed because the verification attempt counter may not update quick enough to accurately account for the multiple parallel attempts. Globally maintaining verification codes and verification attempt counters may result in significant overhead and client latency due to replication used to maintain consistent counts. Thus, there is a need for improved security against parallel attacks towards multiple data stores in order to mitigate unauthorized access to user accounts.

Accordingly, as provided herein, a verification code may be encoded with identifying information of a data store within which the verification code and a verification attempt counter is stored. In this way, a submitted verification code (e.g., the user submitting the verification code to the service) may be routed to a corresponding data store for verification and enforcement of the verification attempt counter. Because longer verification codes may be hard for users to remember and thus frustrating, the identifying information of the data store may be encoded within the verification code without significantly reducing entropy of the verification code (e.g., without significantly reducing a possible number of verification codes), which may improve security.

Figure 4:
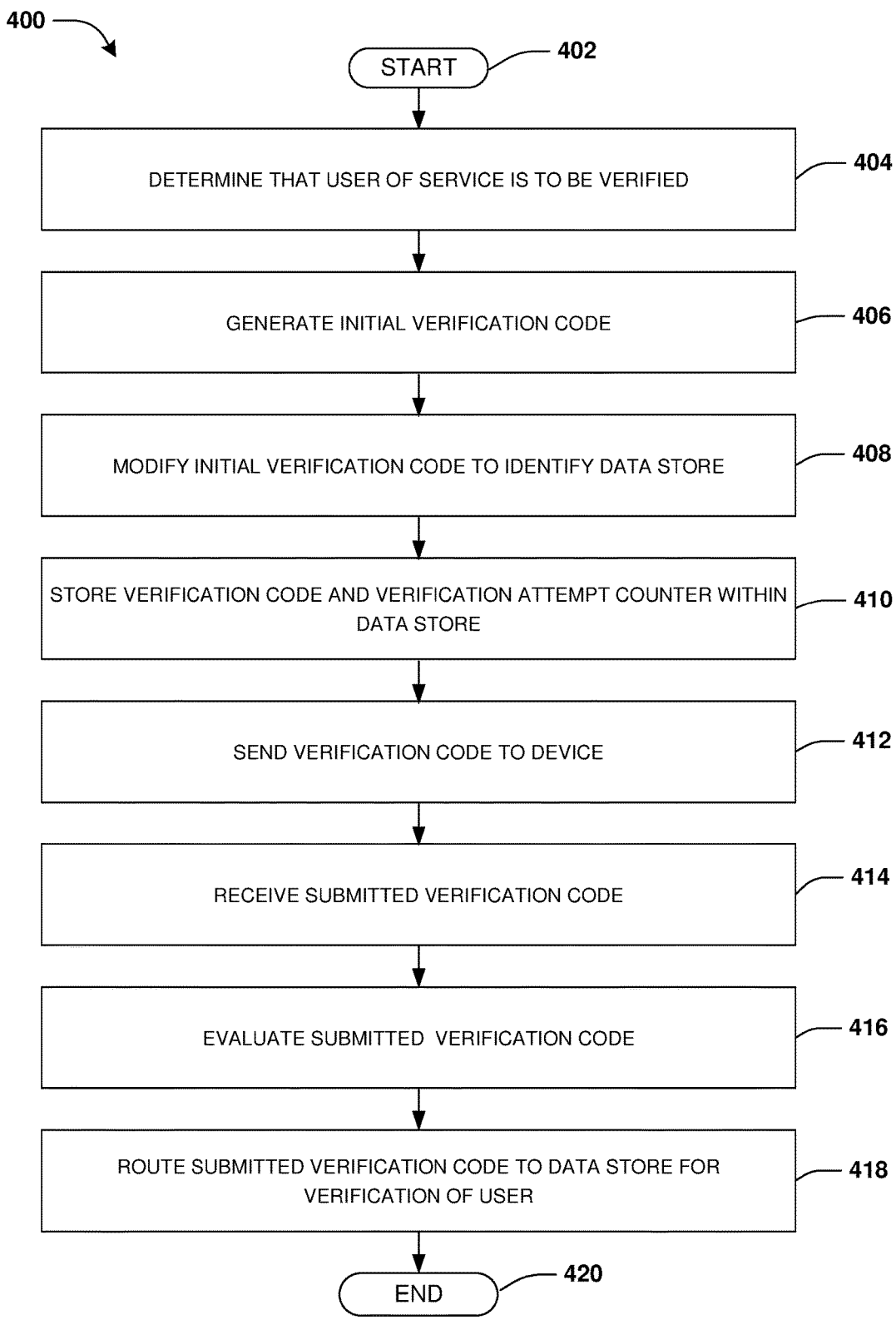
FIG. 4 is a flow chart illustrating an example method for verifying a user of a service.

An embodiment of verifying a user of a service is illustrated by an example method 400 of FIG. 4. At 402, the method 400 starts. A user, such as user Jill, may maintain a user account with a service. The service may be hosted across a plurality of data centers comprising data stores, such as databases, used to store data. In this way, if a data center fails, then a surviving data center may provide clients with uninterrupted access to the service. The service may use a verification technique to determine that a user attempting to access user Jill's account is in fact user Jill. For example, the verification technique may verify that the user is in physical possession of a registered device owned by user Jill, such as a personal cellphone. Accordingly, at 404, a determination may be made that the user is to be verified (e.g., the user may attempt to recover user Jill's account). At 406, an initial verification code may be generated. In an example, the initial verification code may comprise a set of digits or characters, such as 4 randomly selected digits or any other number of digits or characters.

At 408, the initial verification code may be modified to identify a data store, of the plurality of data stores, to create a verification code to store within the data store for subsequent verification of the user (e.g., an identification of the data store may be encoded into the initial verification code to create the verification code). It may be appreciated that in one example, the verification code may be directly created with an encoding of the data store without creating and modifying the initial verification code. It may be appreciated, any other data or information may be encoded into the verification code using the techniques described herein.

In an example of creating the verification code, at least one digit of the set of digits (e.g., or at least one character of a set of characters) may be modified to identify the data store to create the verification code (e.g., a value of a first digit may be used to represent data stores, such as 1 for a first data store, 2 for a second data store, 3 for a third data store, etc.).

In another example of creating the verification code, numerical ranges of the set of digits may be assigned to data stores. For example, numbers 0000-4999 may be assigned to the first data store, numbers 4999-9999 may be assigned to the second data store, etc. The initial verification code may be modified or selected to comprise digits within the numerical range of digits to create the verification code. For example, fine-tuned bit masks may be used to distribute sets of characters per data store.

In another example of creating the verification code, a secret key (e.g., a key maintained in secret by the service) may be utilized to modify the initial verification code to create the verification code. A mathematical computation, such as an XOR operation, may be performed upon the initial verification code using the secret key to create the verification code. For example, the service may mix in the secret key to the spread of digits in order to limit the ability of an attacker to attack only specific codes.

In another example of creating the verification code, a user specific key, corresponding to the user, may be generated. For example, the user specific key may be derived from user specific information, such as a username, date of birth, or other information. The user specific key may be used to modify the initial verification code to create the verification code. For example, the user specific key may be used to mask bits in order to spread numbers per user so that an attacker may be unable to randomly guess verification codes for various users and may be limited to user specific attacks in order to benefit from reduced entropy.

In another example of creating the verification code, a secret salt and/or a user specific salt may be used to modify the initial verification code (e.g., the initial verification code may be randomly selected and then modified) to create a modified initial verification code. A hash (e.g., using hash collisions) of the modified initial verification code (e.g., a cryptographically strong hash, such as SHA1, or any other hash function) may be computed to create a hashed initial verification code. If the hashed initial verification code corresponds to the data store, then the hashed initial verification code is used as the verification code. If the hashed initial verification code does not correspond to the data store, then new initial verification codes are generated, modified, and hashed until a hashed initial verification code, indicative of the data store, is generated. The hash based approach may make it relatively difficult (e.g., almost impossible) for an attacker, even an inside attacker, to know which verifications codes are possible for a specific user. Thus, a hash collision calculation may be used to encode site information inside the verification code without making it easier for an attacker to guess the possible verification codes.

In another example of creating the verification code, a temporal factor may be added to the initial verification code. That is, time may be used to vary the input to the hash and/or bitmasks, used to encode the identification of the data store, to add the temporal factor to possible verification codes. The temporal factor may be added into the user specific salt and/or the secret salt. In an example, a day of the year may be used as an input for verification code generation and a number of verification codes generated may be limited for a user per day.

At 410, the verification code and the verification attempt counter may be stored within the particular data store. At 412, the verification code may be sent to the device of the user (e.g., the verification code may be sent to user Jill's phone as a text message). At 414, a submitted verification code may be received (e.g., Jill may submit the verification code, received as the text message, to the service; an attacker or bot may submit the submitted verification code as an attempt to guess the verification code in order to falsely verify as Jill; etc.). At 416, the submitted verification code may be evaluated to determine what data store to route the submitted verification code for verification. In an example, if the submitted verification code is the verification code, then the submitted verification code may be evaluated to determine that the data store, comprising the verification code and the verification attempt counter, is encoded within the verification code. In an example, if the submitted verification code is a different verification code (e.g., Jill may have mistyped the verification code; the attacker or bot attempted an incorrect verification code; etc.), then the submitted verification code may be evaluated to identify the data store (e.g., and thus will be not verified because the submitted verification code does not match the verification code within the data store, and the verification attempt counter may be incremented for the failed attempt) or a different data store identified by the submitted verification code (e.g., and thus will not be verified).

At 418, the submitted verification code may be routed to whatever data store was identified by the submitted verification code for verification. In an example where the submitted verification code is the verification code sent to the device, the submitted verification code may be sent to the data store for verification (e.g., to determine whether the submitted verification code matches the verification code and whether the verification attempt counter is below a threshold amount of attempts). In this way, the user may be verified or not verified (e.g., the submitted verification code is routed to a data store that does not comprise the verification code and thus is not verified; the submitted verification code does not match the verification code and thus is not verified; the verification attempt counter is not below the threshold and thus is not verified; etc.). At 420, the method 400 ends.

FIGS. 5A-5G illustrate examples of a system 500 for verifying a user of a service 514 configured to store data across a plurality of data stores, such as a first data store 516, a second data store 518, a third data store 520, etc., such as databases maintained in different data centers. Fig. A illustrates a user Jack 502 attempting to access 512 the service 514 (e.g., access 512 Jack's account) through a service website 506 displayed through a desktop device 504. The service 514 may request 508 that user Jack 502 verify that it is in fact user Jack 502 attempting to access the service 514.

Figure 5A:
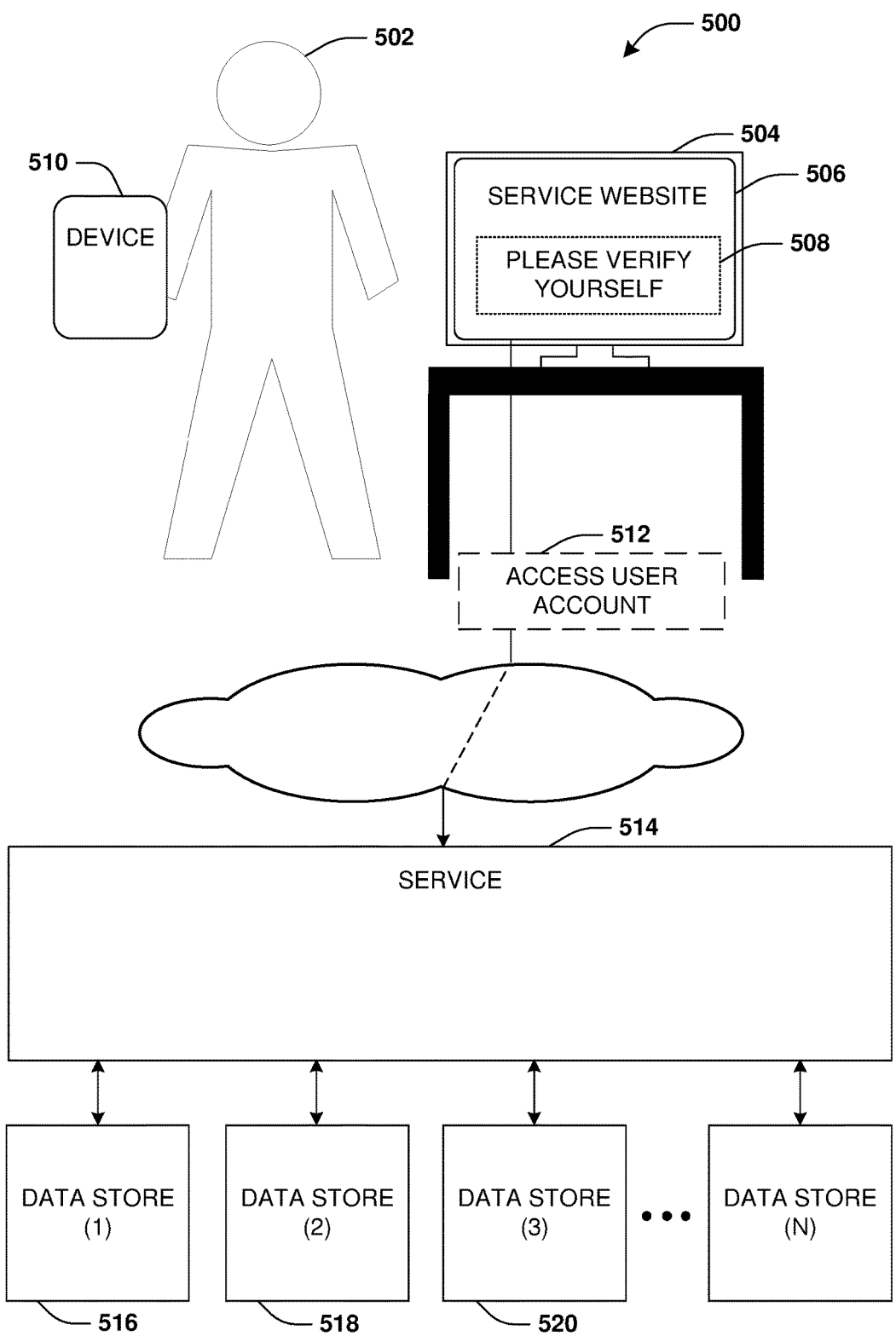
FIG. 5A is a component block diagram illustrating an example system for verifying a user of a service, where a user is attempting to access a service.
Figure 5B:
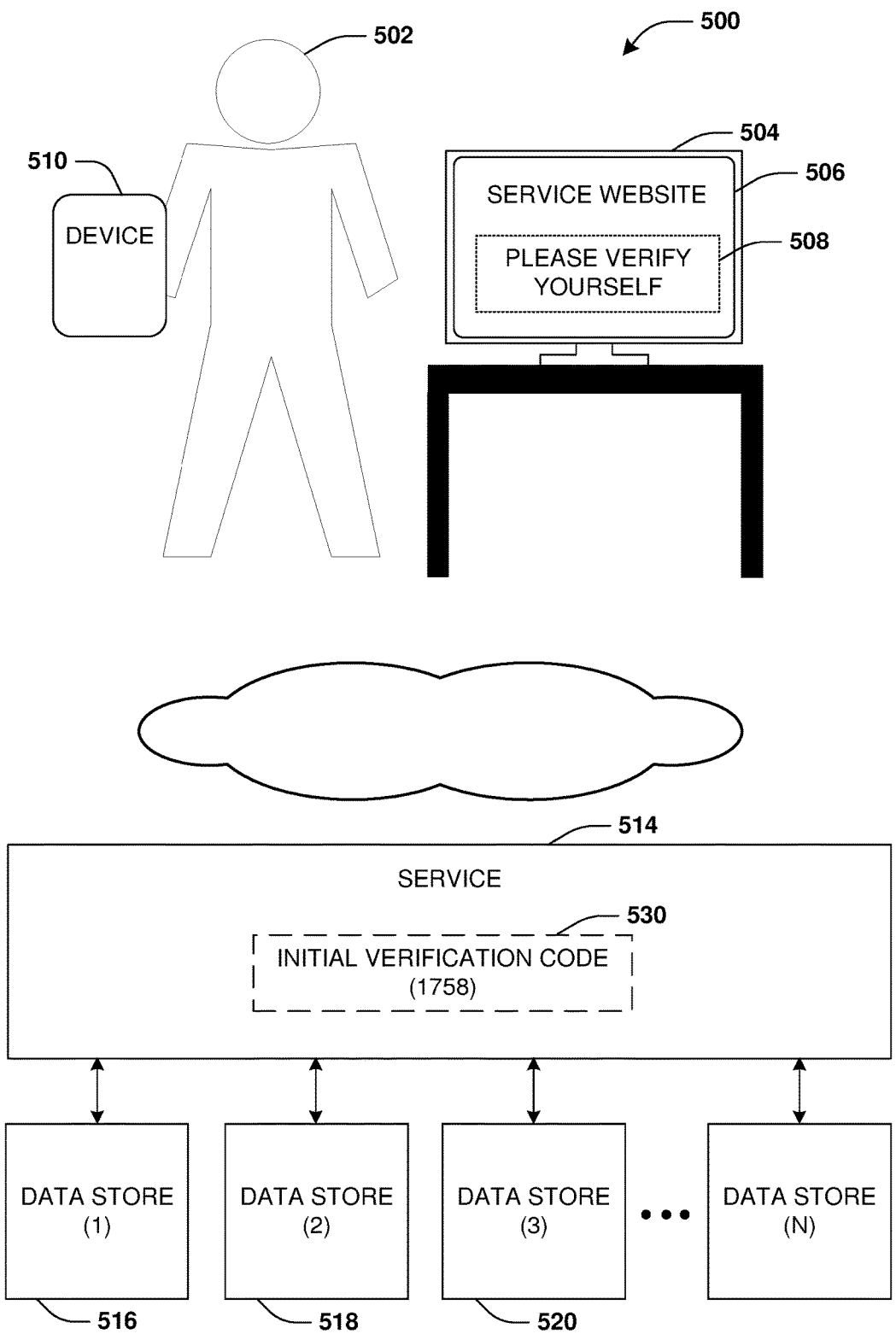
FIG. 5B is a component block diagram illustrating an example system for verifying a user of a service, where an initial verification code is generated.
Figure 5C:
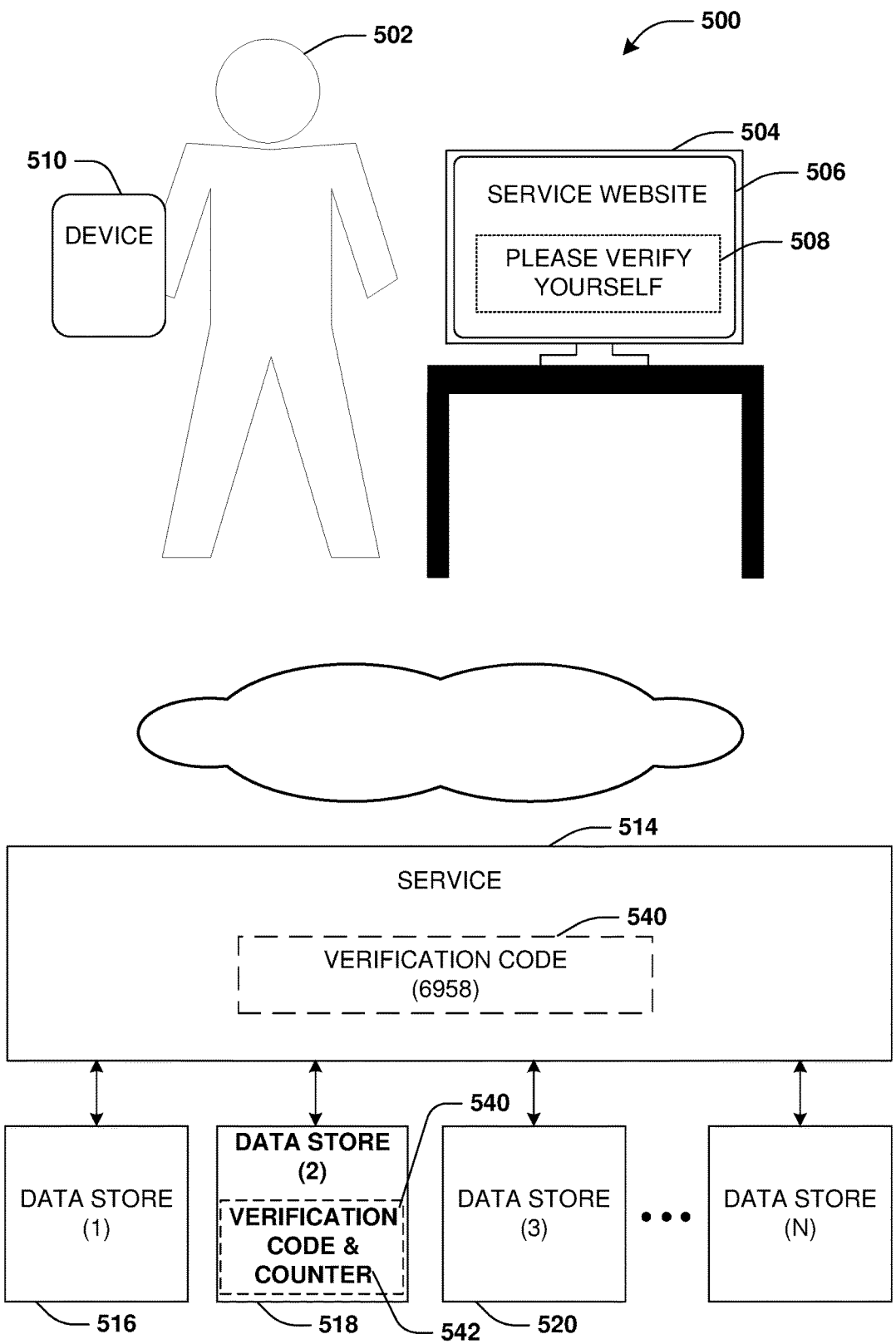
FIG. 5C is a component block diagram illustrating an example system for verifying a user of a service, where a verification code is created.

FIG. 5B illustrates the service 514 generating an initial verification code 530, such as a set of digits 1758 (e.g., the set of digits 1758 may be randomly generated). FIG. 5C illustrates the service 514 modifying the initial verification code 530 to identify the second data store 518 (e.g., an identification of the second data store 518 may be encoded into the initial verification code 530) to create a verification code 540, such as a new set of digits 6958, to store within the second data store 518. For example, the initial verification code 530 may be modified based upon at least one of a digit used to represent the data store (e.g., the change of a digit to identify the second data store 518), a range of digits assigned to the second data store 518, a secret key (e.g., a key maintained by the service 514), a user specific key (e.g., a key for user Jack 502), the use of a hash collision technique using a secret salt and/or a user specific salt, and/or a temporal factor. In this way, the verification code 540 and a verification attempt counter 542 may be stored within the second data store 518 for subsequently verifying a submitted verification code for access to user Jack's account.

Figure 5D:
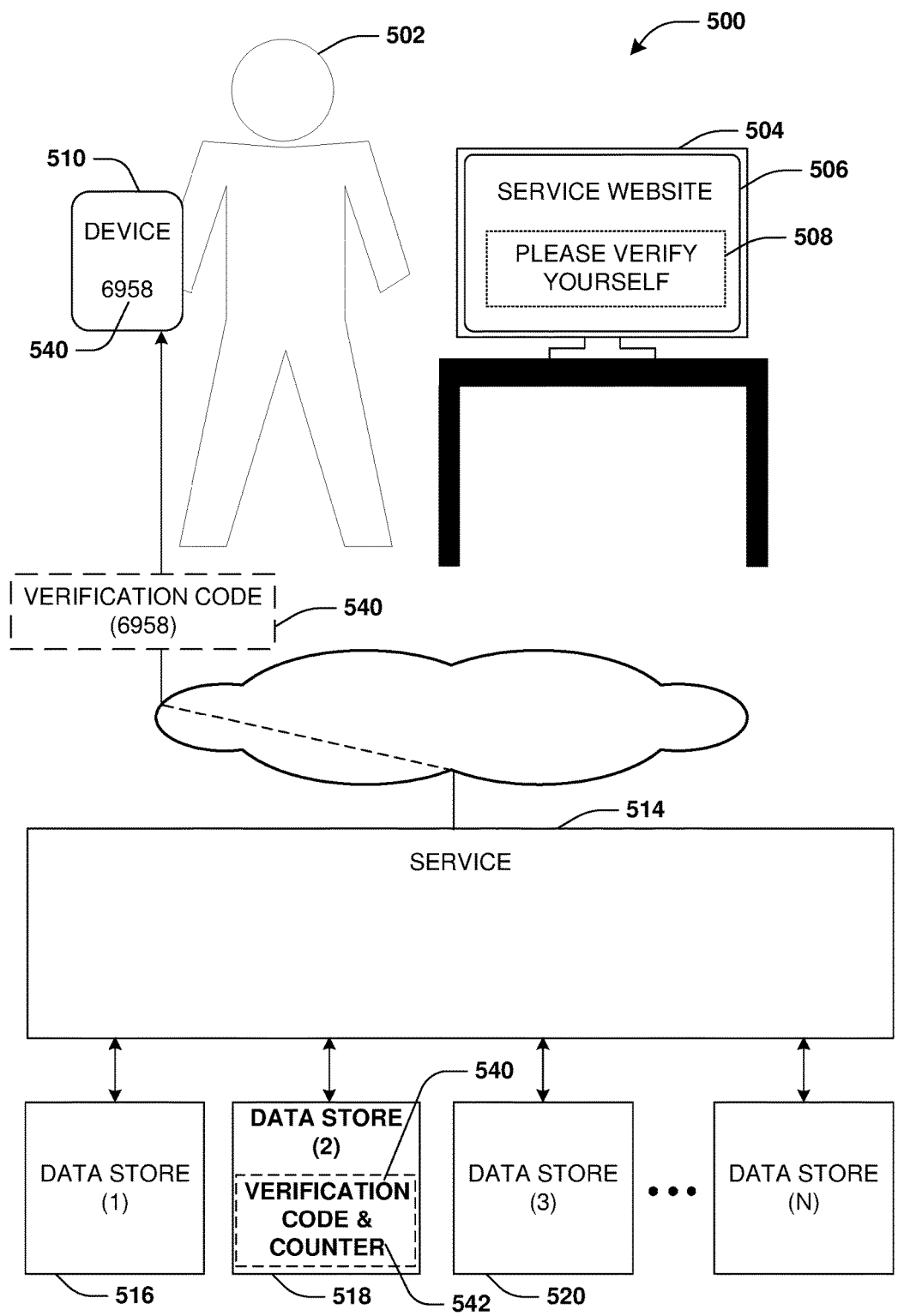
FIG. 5D is a component block diagram illustrating an example system for verifying a user of a service, where a verification code is provided to a device.
Figure 5E:
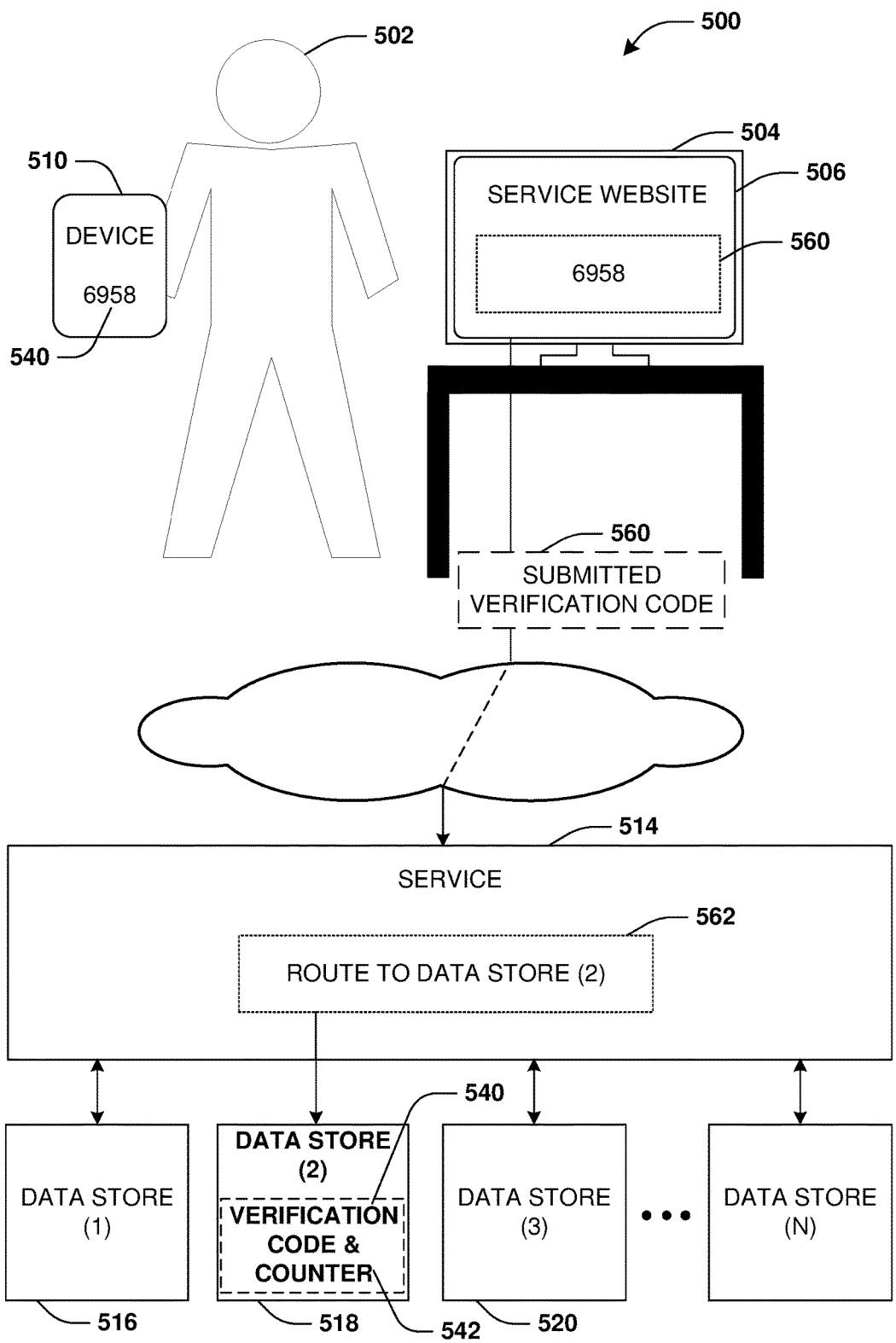
FIG. 5E is a component block diagram illustrating an example system for verifying a user of a service, where a submitted verification code is received.

FIG. 5D illustrates the verification code 540 being sent to a device 510 registered by user Jack 502. Accordingly, the verification code 540 may be displayed through the device 510, such as through a text message. FIG. 5E illustrates the user Jack 502 submitting 6958 as a submitted verification code 560 through the service website 506 to the service 514.

Figure 5F:
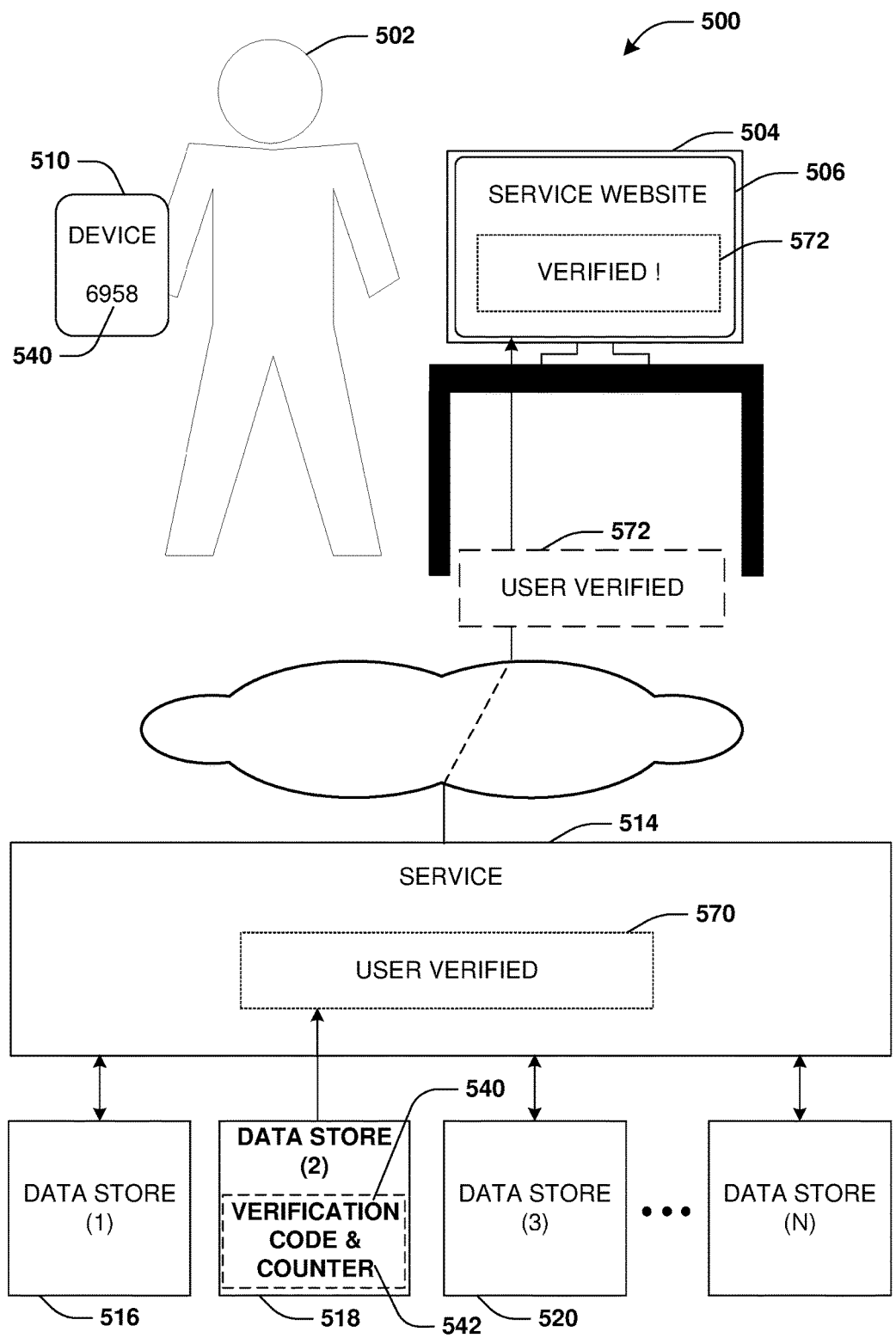
FIG. 5F is a component block diagram illustrating an example system for verifying a user of a service, where a user is verified.

The submitted verification code 560 may be evaluated to determine that the submitted verification code 560 is to be routed 562 to the second data store 518. FIG. 5F illustrates the submitted verification code 560 being verified 570 against the verification code 540 within the second data store 518 without the verification attempt counter 542 exceeding a threshold amount of attempts. Accordingly, a verification message 572 may be provided back to user Jack 502 for access to the service 514.

Figure 5G:
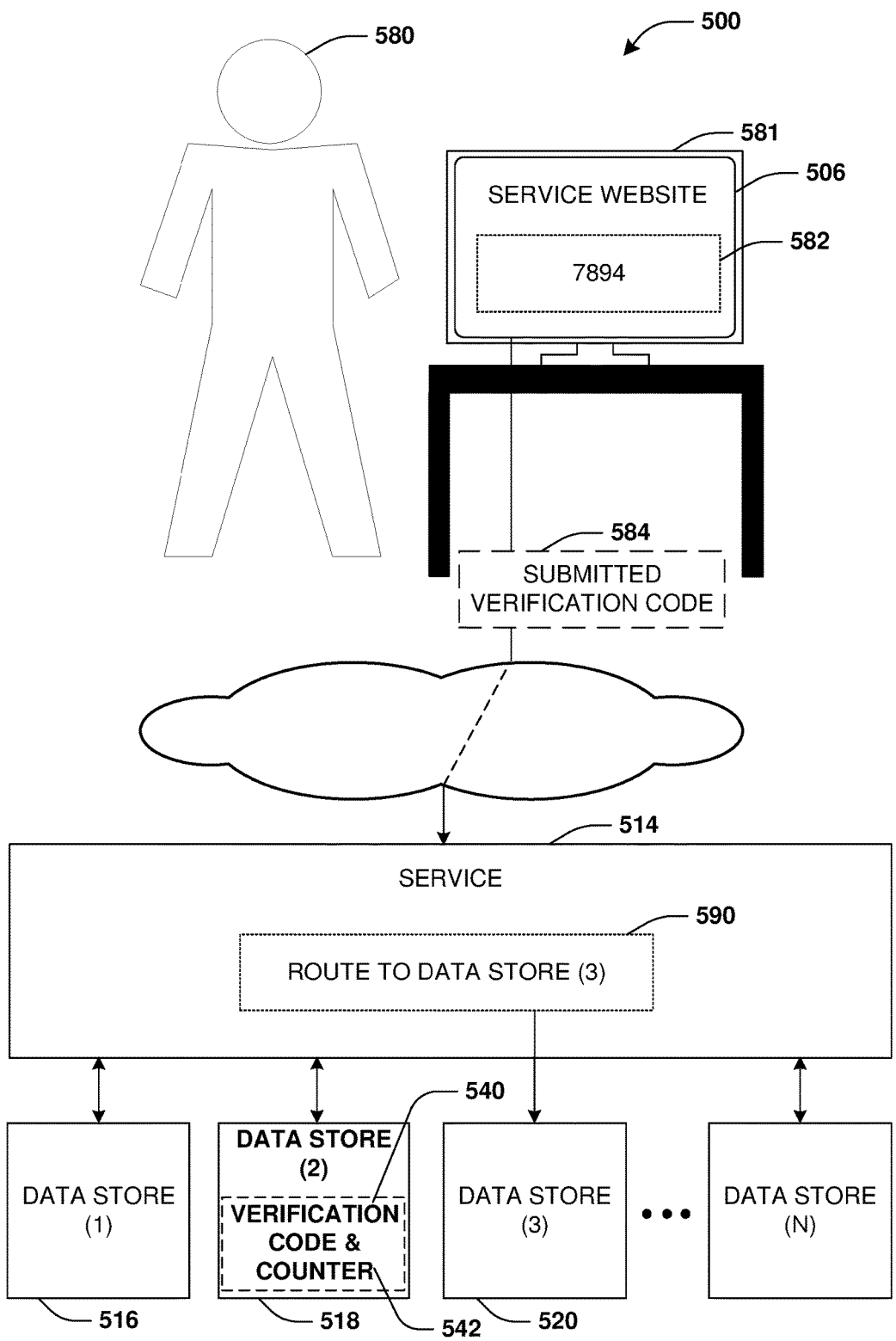
FIG. 5G is a component block diagram illustrating an example system for verifying a user of a service, where a user is not verified.

FIG. 5G illustrates a malicious user 580 attempting to falsely verify to the service 514 as being user Jack 502. For example, the malicious user 580 may access the service website 506 using a device 581 in order to gain access to Jack's account. The service 514 may attempt to verify whether user Jack 502 is accessing Jack's account by sending the verification code 540 to the device 510. Because the malicious user 580 is not in possession of the device 510, the malicious user 580 may attempt a parallel attacker upon the service 514 by submitting verification attempts to the plurality of data stores. For example, a submitted verification code 584 of 7894 may be submitted by the malicious user 580 to the service 514. The service 514 may determine that the submitted verification code 584 should be routed 590 to the third data store 520 (e.g., the first digit of 7 may indicate that the third data store 520 should comprise a corresponding verification code and a corresponding verification attempt counter, which the third data stored 520 does not because the submitted verification code 584 is not correct). If the submitted verification code 584 was the verification code 540 sent to the device 510, then the submitted verification code 584 would have been correctly routed to the second data store 518 for verification using the verification code 540 and the verification attempt counter 542 stored within the second data store 518. However, since the submitted verification code 584 comprises different digits, the submitted verification code 584 is routed 590 to the third data stored 520 that does not comprise the verification code 540 and the verification attempt counter 542, and thus the malicious user 580 will not be verified. In an example, if the malicious user 580 had submitted a second submitted verification code, different than the verification code 540, that is routed to the second data store 518, then the second submitted verification code would not match the verification code 540 and the malicious user 580 would not be verified.

Figure 6:
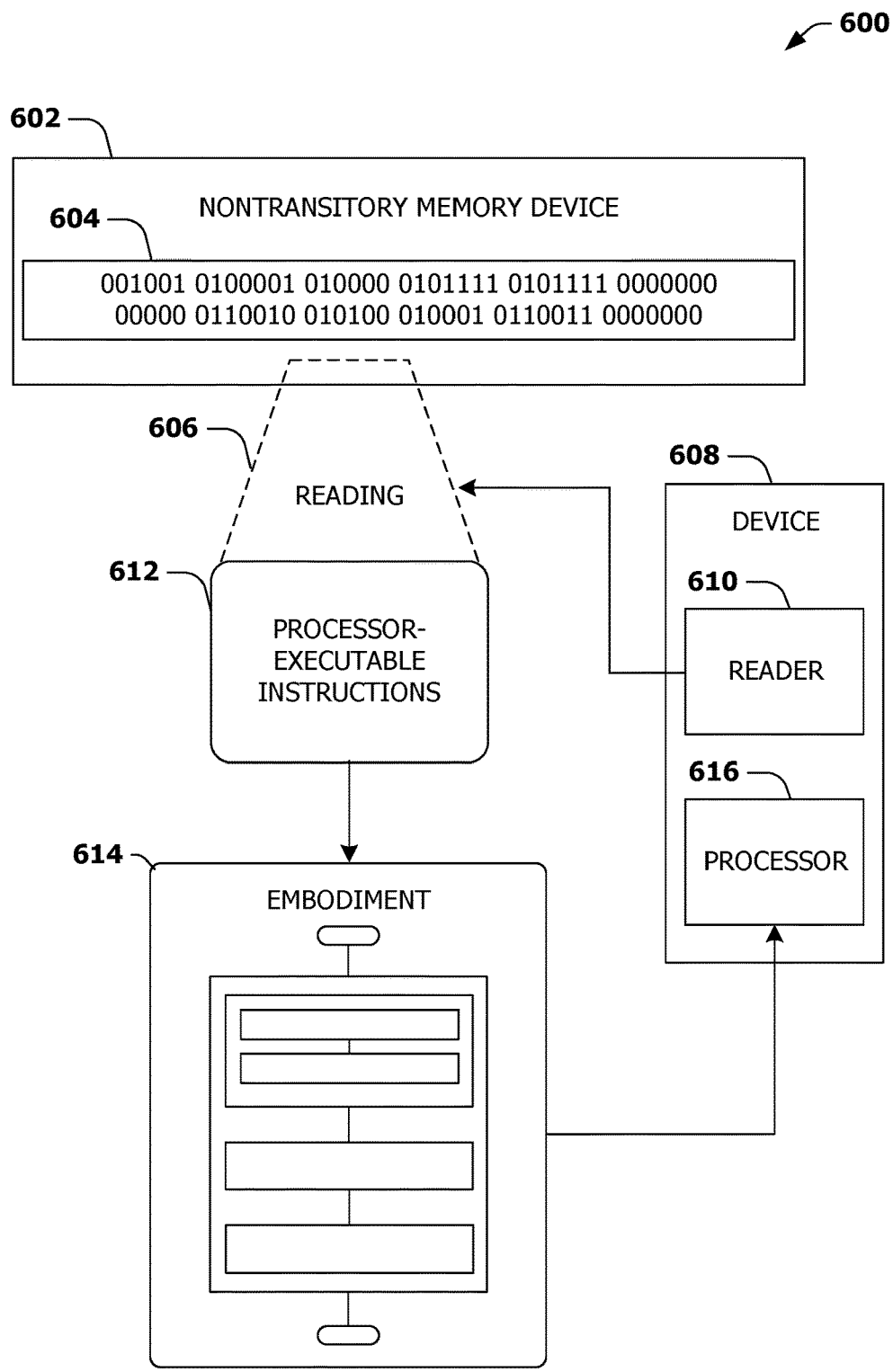
FIG. 6 is an illustration of a scenario featuring an example nontransitory memory device in accordance with one or more of the provisions set forth herein.

FIG. 6 is an illustration of a scenario 600 involving an example nontransitory memory device 602. The nontransitory memory device 602 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 602 stores computer-readable data 604 that, when subjected to reading 606 by a reader 610 of a device 608 (e.g., a read head of a hard disk drive, or a read operation invoked on a solid-state storage device), express processor-executable instructions 612. In some embodiments, the processor-executable instructions, when executed on a processor 616 of the device 608, are configured to perform a method, such as at least some of the example method 300 of FIG. 3, for example. In some embodiments, the processor-executable instructions, when executed on the processor 616 of the device 608, are configured to implement a system, such as at least some of the example system 500 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for verifying a user of a service, comprising:
   determining that a user of a service is to be verified based upon a request from a second device;
   generating an initial verification code;
   modifying the initial verification code to identify a data store, of a plurality of data stores used by the service to store data, but not a second data store, of the plurality of data stores, to create a verification code to store within the data store, the modifying comprising:
   adding a temporal factor to a secret salt to create an updated secret salt;
   adding the updated secret salt to the initial verification code to create a first modified initial verification code;
   adding a second temporal factor to a user specific salt to create an updated user specific salt;
   adding the updated user specific salt to the first modified initial verification code to create a second modified initial verification code;
   computing a hash of the second modified initial verification code to create a hashed initial verification code; and
   responsive to the hashed initial verification code corresponding to the data store, utilizing the hashed initial verification code as the verification code;
   storing the verification code and a verification attempt counter within the data store but not within the second data store;
   sending the verification code to a device;
   receiving a submitted verification code submitted via the second device in association with the verification code being sent to the device;
   evaluating the submitted verification code to determine at least one data store, of the plurality of data stores, to which the submitted verification code is to be routed;
   responsive to determining that the submitted verification code is to be routed to the data store but not the second data store based upon identifying an identifier associated with the data store but not a second identifier associated with the second data store in the submitted verification code, routing the submitted verification code to the data store but not the second data store for verification of the user by determining whether the submitted verification code matches the verification code and whether the verification attempt counter is below a threshold;
verifying the user on the second device based upon a determination that the submitted verification code matches the verification code stored in the data store and a determination that the verification attempt counter is below the threshold;
determining that the user of the service is to be verified based upon a second request from a third device;
receiving a second submitted verification code submitted via the third device in association with the verification code being sent to the device;
evaluating the second submitted verification code to determine at least one data store, of the plurality of data stores, to which the second submitted verification code is to be routed;
responsive to determining that the second submitted verification code is to be routed to the second data store but not the data store based upon identifying the second identifier associated with the second data store but not the identifier associated with the data store in the second submitted verification code, routing the second submitted verification code to the second data store but not the data store for verification of the user by determining whether the second submitted verification code matches verification codes stored in the second data store; and
not verifying the user on the third device based upon a determination that the second submitted verification code does not match the verification codes stored in the second data store.

2. The method of claim 1, the initial verification code comprising a set of digits, and the modifying comprising:
modifying at least one digit of the set of digits to identify the data store to create the verification code.

3. The method of claim 1, the initial verification code comprising a set of digits, and the modifying comprising:
assigning numerical ranges of the set of digits to data stores within the plurality of data stores, a numerical range of digits assigned to the data store; and
modifying the initial verification code to comprise digits within the numerical range of digits to create the verification code.

4. The method of claim 1, the modifying comprising:
utilizing a secret key to modify the initial verification code to create the verification code.

5. The method of claim 4, the utilizing a secret key comprising:
performing a mathematical computation upon the initial verification code using the secret key to create the verification code.

6. The method of claim 1, the modifying comprising:
generating a user specific key corresponding to the user; and
utilizing the user specific key to modify the initial verification code to create the verification code.

7. The method of claim 1, comprising:
responsive to the hashed initial verification code not corresponding to the data store, selecting a new initial verification code for creating the verification code.

8. The method of claim 1, the generating an initial verification code comprising:
generating a set of randomly selected bits as the initial verification code.

9. A non-transitory machine readable medium having stored thereon instructions for performing a method comprising machine executable code which when executed by at least one machine, causes the machine to:
determine that a user of a service is to be verified based upon a request from a second device;
generate an initial verification code;
generate a user specific key corresponding to the user;
utilize the user specific key to modify the initial verification code to create a verification code, the modifying comprising:
adding a temporal factor to a secret salt to create an updated secret salt;
adding the updated secret salt to the initial verification code to create a first modified initial verification code;
adding a second temporal factor to a user specific salt to create an updated user specific salt;
adding the updated user specific salt to the first modified initial verification code to create a second modified initial verification code;
computing a hash of the second modified initial verification code to create a hashed initial verification code; and
responsive to the hashed initial verification code corresponding to the data store, utilizing the hashed initial verification code as the verification code;
store the verification code and a verification attempt counter within a data store;
send the verification code to a device;
receive a submitted verification code submitted via the second device in association with the verification code being sent to the device;
evaluate the submitted verification code to determine at least one data store to which the submitted verification code is to be routed;
responsive to determining that the submitted verification code is to be routed to the data store, route the submitted verification code to the data store for verification of the user by determining whether the submitted verification code matches the verification code and whether the verification attempt counter is below a threshold;
verify the user on the second device based upon a determination that the submitted verification code matches the verification code stored in the data store and a determination that the verification attempt counter is below the threshold;
determine that the user of the service is to be verified based upon a second request from a third device;
receive a second submitted verification code submitted via the third device in association with the verification code being sent to the device;
evaluate the second submitted verification code to determine at least one data store to which the second submitted verification code is to be routed;
responsive to determining that the second submitted verification code is to be routed to a second data store, route the second submitted verification code to the second data store for verification of the user by determining whether the second submitted verification code matches verification codes stored in the second data store; and
not verify the user on the third device based upon a determination that the second submitted verification code does not match the verification codes stored in the second data store.

10. The non-transitory machine readable medium of claim 9, the initial verification code comprising a set of digits, and the modifying comprising:
  modifying at least one digit of the set of digits to identify the data store to create the verification code.

11. The non-transitory machine readable medium of claim 9, the modifying comprising:
  utilizing a secret key to modify the initial verification code to create the verification code.

12. The non-transitory machine readable medium of claim 11, the utilizing a secret key comprising:
  performing a mathematical computation upon the initial verification code using the secret key to create the verification code.

13. The non-transitory machine readable medium of claim 9, the modifying comprising:
  generating a user specific key corresponding to the user; and
  utilizing the user specific key to modify the initial verification code to create the verification code.

14. A computing device comprising:
  a memory containing machine readable medium comprising machine executable code having stored thereon instructions for performing a method of verifying a user of a service; and
  a processor coupled to the memory, the processor configured to execute the machine executable code to cause the processor to:
    determine that a user of a service is to be verified based upon a request from a second device;
    generate an initial verification code;
    modify the initial verification code to identify a data store, of a plurality of data stores used by the service to store data, but not a second data store, of the plurality of data stores, to create a verification code to store within the data store, the modifying comprising:
      adding a temporal factor to a secret salt to create an updated secret salt;
      adding the updated secret salt to the initial verification code to create a first modified initial verification code;
      adding a second temporal factor to a user specific salt to create an updated user specific salt;
      adding the updated user specific salt to the first modified initial verification code to create a second modified initial verification code;
      computing a hash of the second modified initial verification code to create a hashed initial verification code; and
      responsive to the hashed initial verification code corresponding to the data store, utilizing the hashed initial verification code as the verification code;
    store the verification code and a verification attempt counter within the data store but not within the second data store;
    send the verification code to a device;
    receive a submitted verification code submitted via the second device in association with the verification code being sent to the device;
    evaluate the submitted verification code to determine at least one data store, of the plurality of data stores, to which the submitted verification code is to be routed;
    responsive to determining that the submitted verification code is to be routed to the data store but not the second data store based upon identifying an identifier associated with the data store but not a second identifier associated with the second data store in the submitted verification code, route the submitted verification code to the data store but not the second data store for verification of the user by determining whether the submitted verification code matches the verification code and whether the verification attempt counter is below a threshold;
    verify the user on the second device based upon a determination that the submitted verification code matches the verification code stored in the data store and a determination that the verification attempt counter is below the threshold;
    determine that the user of the service is to be verified based upon a second request from a third device;
    receive a second submitted verification code submitted via the third device in association with the verification code being sent to the device;
    evaluate the second submitted verification code to determine at least one data store, of the plurality of data stores, to which the second submitted verification code is to be routed;
    responsive to determining that the second submitted verification code is to be routed to the second data store but not the data store based upon identifying the second identifier associated with the second data store but not the identifier associated with the data store in the second submitted verification code, route the second submitted verification code to the second data store but not the data store for verification of the user by determining whether the second submitted verification code matches verification codes stored in the second data store; and
    not verify the user on the third device based upon a determination that the second submitted verification code does not match the verification codes stored in the second data store.

15. The computing device of claim 14, the initial verification code comprising a set of digits, and the modifying comprising:
  modifying at least one digit of the set of digits to identify the data store to create the verification code.

16. The computing device of claim 14, the initial verification code comprising a set of digits, and the modifying comprising:
  assigning numerical ranges of the set of digits to data stores within the plurality of data stores, a numerical range of digits assigned to the data store; and
  modifying the initial verification code to comprise digits within the numerical range of digits to create the verification code.

17. The computing device of claim 14, the modifying comprising:
  utilizing a secret key to modify the initial verification code to create the verification code.

18. The computing device of claim 17, the utilizing a secret key comprising:
  performing a mathematical computation upon the initial verification code using the secret key to create the verification code.

19. The computing device of claim 14, the modifying comprising:
  generating a user specific key corresponding to the user; and
  utilizing the user specific key to modify the initial verification code to create the verification code.

20. The computing device of claim 14, the processor configured to execute the machine executable code to cause the processor to:
   responsive to the hashed initial verification code not corresponding to the data store, select a new initial verification code for creating the verification code.

\* \* \* \* \*